United States Patent
Inagawa et al.

(10) Patent No.: US 7,068,020 B2
(45) Date of Patent: Jun. 27, 2006

(54) STEP-DOWN DC—DC CONVERTER

(75) Inventors: Toshinori Inagawa, Saitama (JP); Motohiro Shimizu, Saitama (JP); Kenji Kamimura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/093,041

(22) Filed: Mar. 30, 2005

(65) Prior Publication Data

US 2005/0219862 A1   Oct. 6, 2005

(30) Foreign Application Priority Data

Mar. 31, 2004 (JP) ............................ 2004-102143

(51) Int. Cl.
*G05F 1/56* (2006.01)
*H02M 3/06* (2006.01)

(52) U.S. Cl. .................................... 323/282; 363/62

(58) Field of Classification Search ................ 323/282, 323/283, 285; 363/15, 62, 78, 80; 327/530
See application file for complete search history.

(56) References Cited

U.S. PATENT DOCUMENTS 5,677,619 A * 10/1997 Doluca ..................... 323/282
6,356,059 B1 * 3/2002 Yu .............................. 323/223
6,452,369 B1 * 9/2002 Lang .......................... 323/285
6,879,138 B1 * 4/2005 Dinh et al. .................. 323/284

FOREIGN PATENT DOCUMENTS

JP 5-91732 4/1993
JP 8-33322 2/1996

* cited by examiner

*Primary Examiner*—Adolf Berhane
(74) *Attorney, Agent, or Firm*—Westerman, Hattori, Daniels & Adrian, LLP.

(57) ABSTRACT

An N-channel MOS transistor is used to configure a DC—DC converter having good characteristics without providing a particular voltage circuit which outputs a voltage higher than an input voltage. An N-channel MOS transistor 11 and a choke coil 12 are connected in series between a negative side of a direct-current power supply and a negative side of the output capacitor 8. A PWM circuit 14 applies pulse signals to a gate of the MOS transistor 11 based on the input voltage divided by the capacitors 9 and 10. The pulse signal of the PWM circuit 14 is formed by the voltage corresponding to the output voltage of the output capacitor 8, and the pulse signal is inputted to the gate of the N-channel MOS transistor 11 through a photocoupler 16.

2 Claims, 4 Drawing Sheets

STEP-DOWN DC—DC CONVERTER

BACKGROUND OF THE INVENTION

1. Field of the Invention

The present invention relates to a step-down DC-DC converter, particularly to the step-down DC-DC converter which can take out stable voltage in a broad input-voltage range.

2. Description of the Related Art

The step-down DC-DC converter which converts an input voltage into a direct-current voltage lower than the input voltage by interrupting the input voltage with a switching element is well known. For example, in the step-down DC-DC converter disclosed in Japanese Patent Laid-Open Publication No. H5-91732 (document 1), an N-channel FET is used as the switching element, the voltage generated by energy accumulated in a reactor during a time interval in which the N-channel FET is turned off, is added to the input voltage and then the voltage is supplied to a PWM drive circuit which drives the N-channel FET.

Further, in the step-down DC-DC converter disclosed in Japanese Patent Laid-Open Publication No. H8-33322, in order to securely prevent over-voltage, a circuit which performs charging and discharging in response to the turn-on and turn-off of a P-channel FET as a semiconductor switch is provided, and its output is stopped when a charging voltage of the charging and discharging circuit indicates an abnormal value.

Thus, conventionally the N-channel FET or the P-channel FET is used as the switching element of the step-down DC-DC converter. When the N-channel FET is driven, because the voltage higher than a drain voltage which is of a power supply voltage is applied to a gate, a bootstrap circuit described in the document 1 is required.

On the other hand, the P-channel FET can be driven when the gate voltage is lowered with respect to the source voltage, so that a circuit configuration is relatively simplified.

However, due to the configuration of FET, when compared to the N-channel FET, it is difficult to produce the P-channel FET which has a good on-characteristic or a good switching characteristic, and the P-channel FET has tendencies of low withstand voltage and low current capacity. Therefore, the P-channel FET having the good characteristics cannot be produced.

Particularly the P-channel FET is not good enough when good operation is required in applications in which the input voltage fluctuates. For example, in the step-down DC-DC converter used for an engine generator which is started up using a recoil starter, it is necessary to start engine control in the low number of revolutions, and it is also necessary to securely operate to electric power generated by the high number of revolutions after the start-up. The input voltage to the step-down DC-DC converter fluctuates in the range of 5 to 450 volts (V). Therefore, in the circuit in which the N-channel FET is used, it is difficult to configure a control power supply of the engine generator based on the inputs of such the broad voltage range.

In order to take out the best output voltage of the generator from an early time when the DC-DC converter cannot output the maximum voltage because of the low number of revolutions, it is necessary to make FET in an on state (substantially 100% duty). However, in the conventional N-channel FET driving method, because the bootstrap circuit is charged during the time interval in which FET is turned off, the turn-off interval of FET is required and FET cannot be driven at duty of 100%.

SUMMARY OF THE INVENTION

An object of the present invention is to provide a step-down DC-DC converter having a simple configuration, which can secure the stable voltage and have a good output-voltage build-up characteristic.

In order to accomplish the object, a first aspect of the present invention resides in that a step-down DC-DC converter comprises switching means which includes at least one MOS transistor connected to a direct-current power supply, at least one reactor which is charged by the direct-current power supply during a time interval in which the MOS transistor is turned on, an output capacitor which is connected to the direct-current power supply through the MOS transistor and the reactor, the output capacitor supplying a current to a load, and a pulse width modulation circuit being inputted a voltage corresponding to an output voltage of the output capacitor and applying a pulse signal of a duty according to the voltage to a gate of the MOS transistor, wherein the MOS transistor is an N-channel type, the N-channel MOS transistor and the reactor are sequentially connected in series between a negative side of the direct-current power supply and a negative side of the output capacitor, and a power supply of the pulse signal applied to the gate of the N-channel MOS transistor is supplied between a positive side and the negative side of the direct-current power supply.

A second aspect resides in that the pulse signal of the pulse width modulation circuit is formed by the voltage corresponding to the output voltage of the output capacitor, and the pulse signal is inputted to the gate of the N-channel MOS transistor through an isolation circuit.

According to the first aspect, the circuit having the good characteristics can be produced using the N-channel MOS transistor in which the good on-characteristic and the good switching characteristic are easily obtained. Since the N-channel MOS transistor is provided on the negative side of the direct-current power supply, it is not needed to provide the circuit which applies the drive voltage higher than the input voltage to the gate.

When the input voltage is lower than the required output voltage, the MOS transistor can be driven at 100% duty, and the output-voltage build-up characteristic to the input voltage can be remarkably improved.

According to the second aspect, the difference in potential between the drain side and the source side of the N-channel MOS transistor and the output capacitor can be adjusted by an insulation circuit such as a photocoupler.

DETAILED DESCRIPTION OF THE PREFERRED EMBODIMENTS

Figure 1:
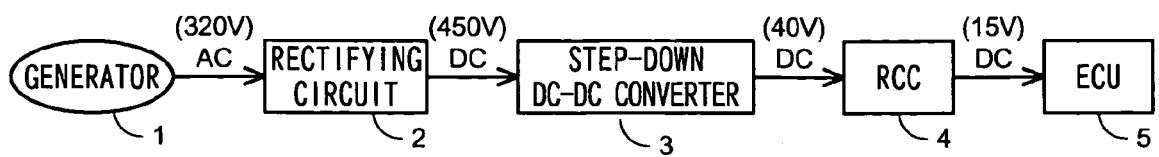
FIG. 1 is a block diagram showing a main-part configuration of an engine generator including a power supply device according to an embodiment of the present invention.

Referring now to the accompanying drawings, a preferred embodiment of the present invention will be described in detail below. FIG. 1 is a block diagram showing a configuration of an engine generator in which a power supply device including an N-channel type MOSFET according to an embodiment of the invention is used. For example, the engine generator having a battery, or the engine generator having a recoil starter which can manually be started up when the battery is in an over-discharge state even if the engine generator has the battery is suitable for the engine generator used in the embodiment. The engine generator includes a generator 1, a rectifying circuit 2, a step-down DC-DC converter (hereinafter simply referred to as "down-converter") 3, a ringing choke converter (RCC) 4, and ECU 5. The generator 1 is driven by an engine to output three-phase alternating-current voltage such as 320V in a rated running state. The rectifying circuit 2 rectifies the three-phase alternating-current 320V to direct-current voltage such as 450V, and the direct-current 450V is inputted to the down-converter 3. The down-converter 3 steps down the direct-current 450V to a voltage such as 40V using duty control with a semiconductor switch.

A primary side of RCC 4 is connected to an output side of the down-converter 3 and a secondary side of RCC 4 is connected to a control device, i.e. ECU 5 which controls the engine driving the generator 1. Thus, the three-phase alternating current generated by the generator 1 is rectified to the direct current, the direct current is stepped down to a voltage such as 40V by the down-converter 3, and then RCC 4 converts the direct-current 40V into a stable voltage such as 15V. The stable voltage is supplied to ECU 5 as a control power source.

Figure 2:
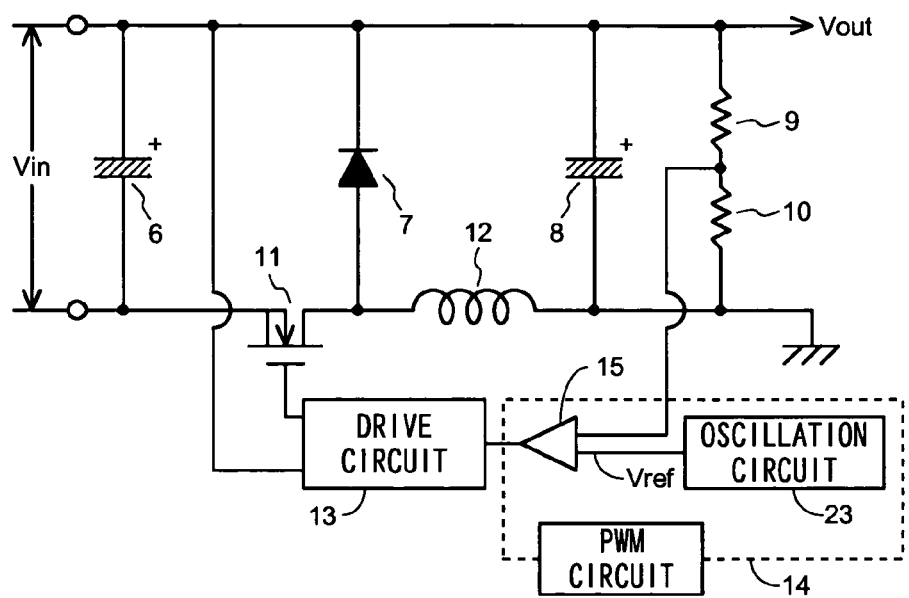
FIG. 2 is a circuit diagram showing a basic configuration of a down-converter.

FIG. 2 shows the basic configuration of the circuit of the down-converter 3. The down-converter 3 is a non-isolated converter which is not provided with a transformer. In FIG. 2, an input capacitor 6, a flywheel diode 7, an output capacitor 8, and output-voltage detection resistors 9 and 10 are provided between a positive side and a negative side on the output side (voltage Vin) of the rectifying circuit 2.

An N-channel MOS-FET 11 and a step-down choke coil (reactor) 12 are connected in series between the negative side of the direct-current power supply and the negative side of the output capacitor 8. A drive circuit 13 which applies the voltage to a gate of MOS-FET 11 is provided. The drive circuit 13 outputs drive signals for turning on and off MOS-FET 11. A PWM circuit 14 which makes PWM (Pulse Width Modulation) signals for determining duty (on time ratio) of the drive signals outputted from the drive circuit 13 is provided. The PWM circuit 14 has an oscillation circuit 23 (see FIG. 3 for more information) which generates reference voltage (triangle wave) Vref for determining the duty of the PWM signals. A comparator 15 which compares the reference voltage Vref and the voltage divided by the resistors 9 and 10 is provided.

When the voltage divided by the resistors 9 and 10 is smaller than the reference voltage Vref having the triangle wave, the PWM circuit 14 outputs the PWM signals at the duty of 100% in order to maintain an on state of MOS-FET 11. When the voltage divided by the resistors 9 and 10 is larger than the reference voltage Vref having the triangle wave, the PWM circuit 14 outputs the PWM signals at the duty lower than 100%, which is determined by the reference voltage Vref and the voltage divided by the resistors 9 and 10.

The drive circuit 13 supplies the drive signals to the gate of MOS-FET 11 according to the PWM signals outputted from the PWM circuit 14. The output capacitor 8 is charged at the voltage according to the on time ratio of MOS-FET 11. An average charging voltage smoothed by the output capacitor 8 is an output voltage Vout. The output voltage Vout is connected to the primary side of RCC 4.

Figure 3:
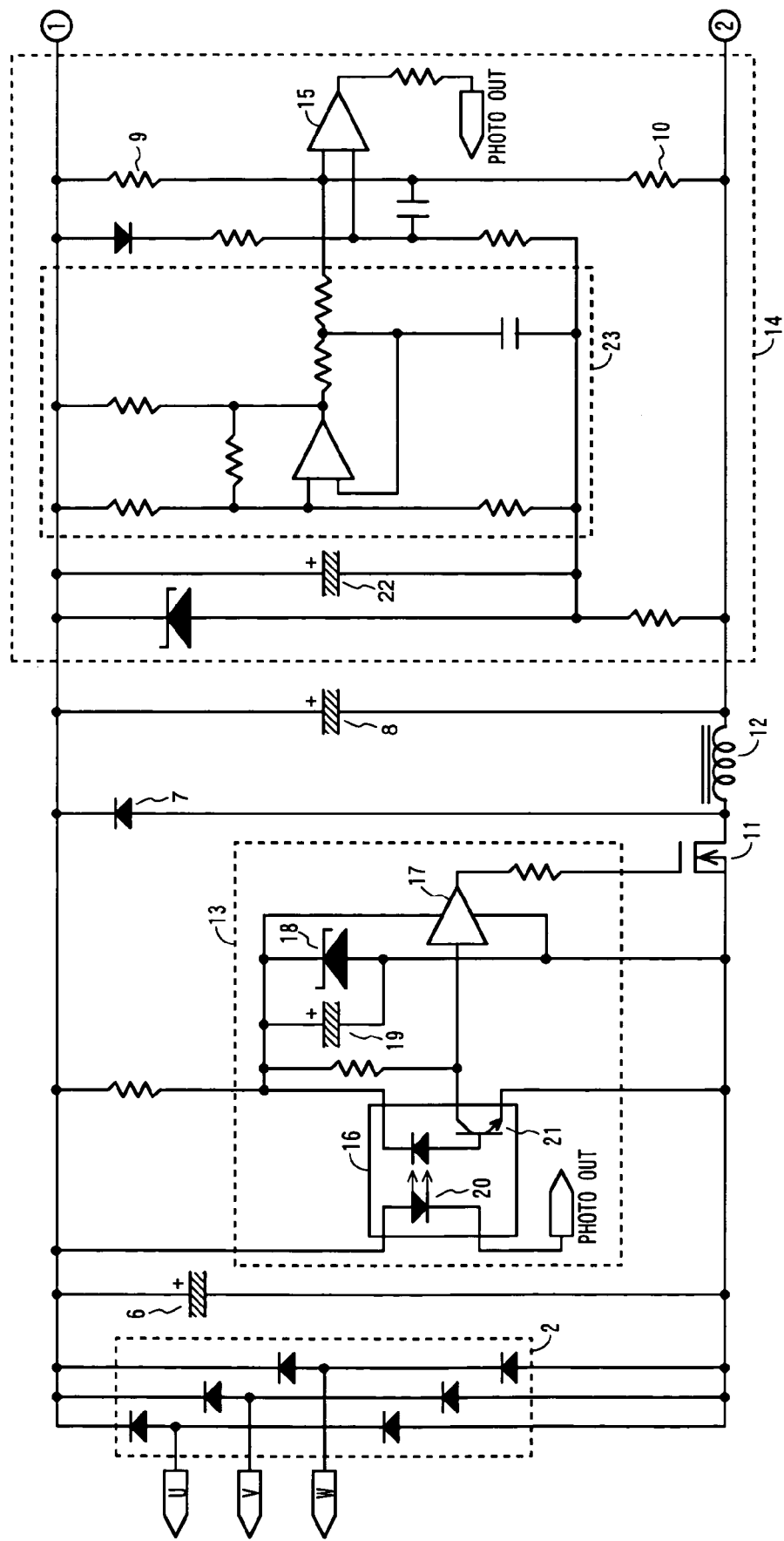
FIG. 3 is a specific circuit diagram of a rectifying circuit and the down-converter.
Figure 4:
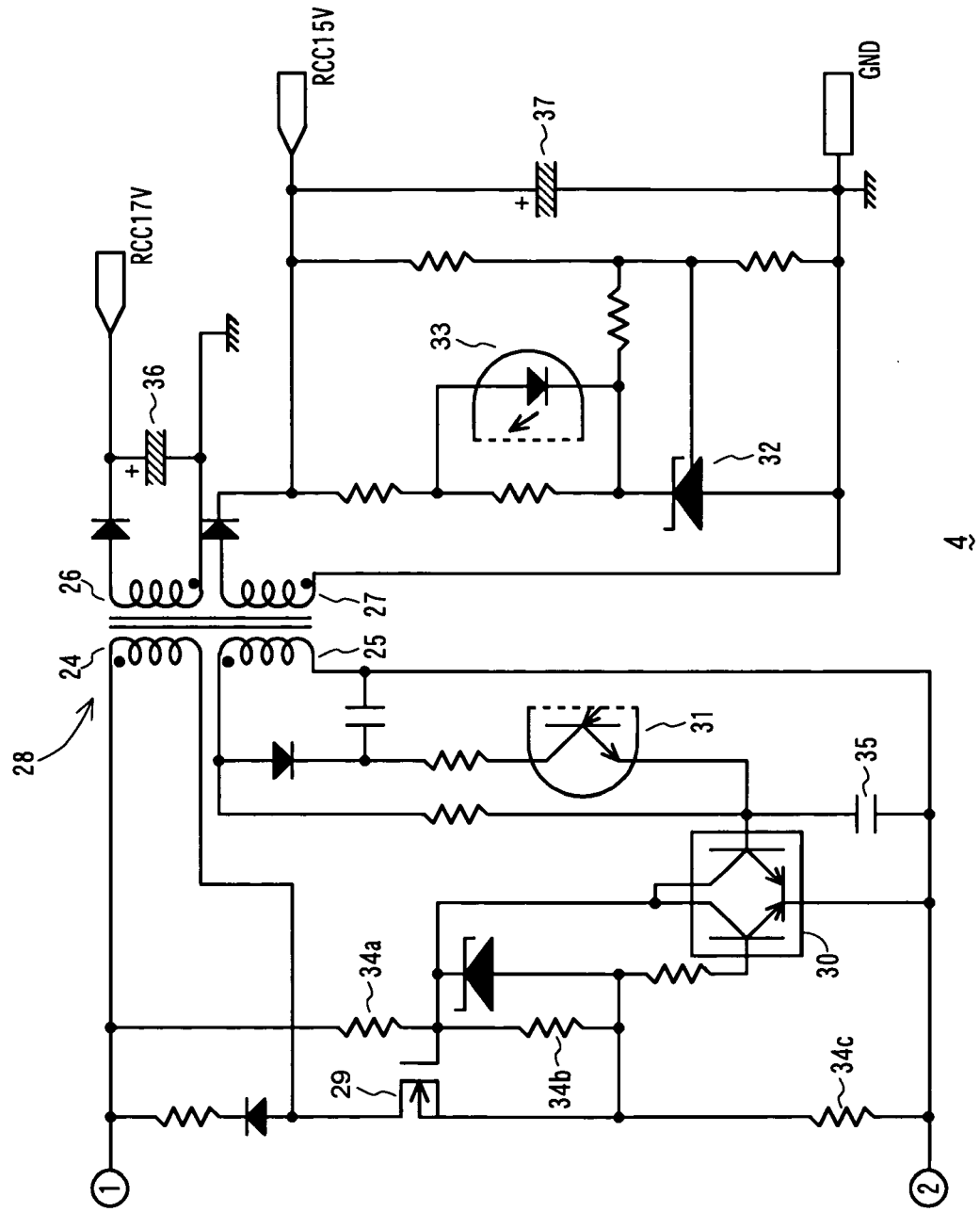
FIG. 4 is a specific circuit diagram of a ringing choke converter (RCC)

FIG. 3 is a circuit diagram of the rectifying circuit 2 and the down-converter 3, and FIG. 4 shows an example of a specific circuit RCC 4. In FIGS. 3 and 4, the same component is indicated by the same reference numeral shown in FIGS. 1 and 2. In FIG. 3, the rectifying circuit 2 includes a diode bridge circuit. The input capacitor 6 makes an input direct-current voltage by charging and smoothing the generator 1 output which is rectified by the rectifying circuit 2. The drive circuit 13 includes a photocoupler 16, an inverter buffer 17, a Zener diode 18, and a capacitor 19. The Zener diode 18 and the capacitor 19 form a power supply voltage for the inverter buffer 17. When the power supply voltage is supplied to the inverter buffer 17, the output of the inverter buffer 17 is supplied to the gate of MOS-FET 11 to turn on MOS-FET 11. The output capacitor 8 is charged only during a time interval in which MOS-FET 11 is turned on.

The photocoupler 16 includes a light emitting diode 20 and a phototransistor 21, and a cathode of the light emitting diode 20 is connected to the output side of the comparator 15 in the PWM circuit 14. Accordingly, the light emitting diode 20 is driven during which the PWM signals from the PWM circuit 14 are in the on state, and the phototransistor 21 is electrically conducted to invert the input of the inverter buffer 17, which turns off MOS-FET 11.

The light emitting diode 20 in the photocoupler 16 is energized by the PWM signals from the PWM circuit 14, and the on time ratio of the phototransistor 21, i.e. the duty of MOS-FET 11 is determined based on the duty of the PWM signals.

When the voltage representing the output voltage Vout (voltage divided by the resistors 9 and 10) exceeds the triangle-wave reference voltage Vref formed by the oscillation circuit 23, the PWM circuit 14 outputs the PWM signals at the duty lower than 100%. The voltage divided by the resistors 9 and 10 is set so as to output the PWM signals having the duty of 100% when the output voltage Vout exceeds a predetermined value (for example, 40V), and a duty ratio is determined so that the output voltage is always restricted to 40V.

In FIG. 4, RCC 4 has a transformer 28 which includes primary-side coils 24 and 25 and secondary-side coils 26 and 27. The primary-side coils 24 and 25 are connected to a self-excited oscillation circuit which includes FET 29, a transistor 30, and a phototransistor 31. The phototransistor 31, and a Zener diode 32 and a light emitting diode 33 which are arranged in the secondary side, constitute a feed-back circuit which controls the secondary side at constant voltage.

The charging voltage of the output capacitor 8, i.e. the output voltage Vout of the down-converter 3, which is connected to the primary side of RCC 4, is divided by resistors 34a, 34b, and 34c and applied to the gate of FET 29. When FET 29 is turned on, the current is passed through the coil 24 to generate the voltage at the coil 25 according to a winding ratio. The voltage generated at the coil 25 boosts the voltage at a capacitor 35 to turn on the transistor

30. When the transistor 30 is turned on, FET 29 is turned off. When the transistor 30 is turned on, the capacitor 35 is discharged through the base of the transistor 30, and the transistor 30 is turned off after a predetermined time elapses. Therefore, FET 29 is turned on again.

When FET 29 is turned off, the voltages are generated at the secondary-side coils 26 and 27 according to each winding ratio to allow output capacitors 36 and 37 to be charged. When the voltage at the output capacitor 37 exceeds a predetermined value (for example, 15V), the light emitting diode 33 is energized to turn on the phototransistor 31, which allows the capacitor 35 to be charged to turn on the transistor 30 at a certain time constant. Then, the gate voltage of FET 29 is lowered, and FET 29 is turned off again. As a result, the current is not passed through the primary coil 24, and the voltage generated on the secondary side is lowered. Thus, the self-excited oscillation is performed in RCC 4. The output voltage of the secondary-side circuit including the secondary-side coil 27 is maintained at the predetermined value, i.e. 15V. Further, the output voltage (for example, 17V) different from the output voltage of the coil 27 can be obtained from the secondary-side coil 26.

The output voltages of the secondary-side coils 26 and 27 are utilized for the start-up and control of the engine generator.

Figure 5:
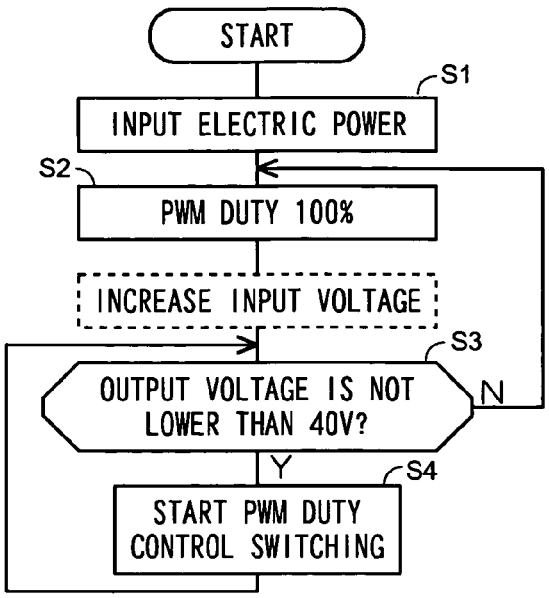
FIG. 5 is a flowchart showing operation of a power supply circuit.

The above-described operation will be described referring to a flowchart shown in FIG. 5. In FIG. 5, the electric power generation is started and the electric power is inputted in Step S1. In Step S2, the duty of the PWM circuit 14 is set at 100%. As used herein, the term of 100% shall mean the duty for substantially maintaining FET 11 at the on state. For example, the term of 100% shall include the duty of about 95%. When FET 11 is substantially turned on by setting the PWM circuit 14 at the duty of 100%, the output voltage Vout is increased as the output voltage of the generator is increased. Step S1 is held until the output voltage becomes above the predetermined value (for example, 40V). When the output voltage Vout reaches the predetermined value, decision in Step S3 becomes affirmative and the flow goes to Step S4. In Step S4, the PWM circuit 14 outputs the PWM signals having the duty lower than 100%, and the drive circuit 13 switches FET 11 according to the PWM signals. Namely, the duty ratio of the switching is controlled so that the output voltage Vout is maintained at 40V.

Figure 6:
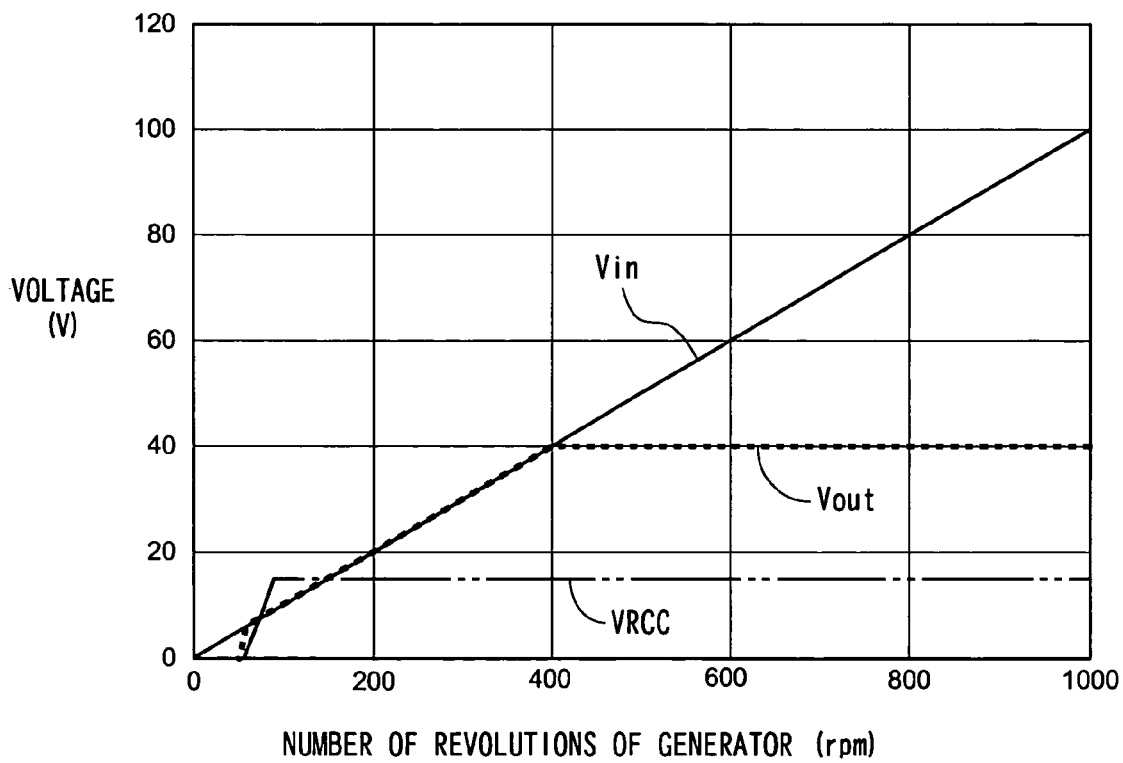
FIG. 6 shows a relationship between the number of revolutions of the generator and generator output voltage, and between down-converter output voltage and RCC output voltage.

FIG. 6 shows a relationship between the voltage and the number of revolutions of the generator 1. In FIG. 6, voltage Vin represents the output voltage of the generator 1, voltage Vout represents the output voltage of the down-converter 3, and voltage VRCC represents the output voltage of the secondary-side circuit or RCC 4 including the secondary-side coil 27. As shown in FIG. 6, as the number of revolutions of the generator 1 is increased, the voltage Vin is increased. However, even though the number of revolutions of the generator 1 is increased, the voltage Vout is restricted to the predetermined value (for example, 40V) by duty control, and the increase in voltage Vout is suppressed. The voltage VRCC is stabilized at the predetermined value (for example, 15V) by the self-excited oscillation action of RCC 4.

RCC 4 starts the operation before the voltage Vout reaches the predetermined value, i.e. 40V, and the gate voltage of FET 29 is set so that the voltage VRCC generates the predetermined value, i.e. 15V. As shown in FIG. 6, the voltage VRCC generates the stable voltage of 15V in the range of the low number of revolutions lower than the number of revolutions at which the voltage Vout reaches 40V. Thus, since the self-excited oscillation converter has the step-up function by the transformer, the step-up function can obtain the stable output voltage VRCC exceeding the voltage Vin in the range of the low number of revolutions.

According to the embodiment, in the range of the low number of revolutions of the engine like the case in which the start-up operation of the engine is performed by the recoil starter, the sufficient output voltage is obtained even by the low voltage induced by the generator, and the stable power supply for starting up ECU can be secured.

On the other hand, even after the high output voltage is generated from the generator as the number of revolutions is increased after the start-up of the engine, the high-speed switching of the N-channel FET restricts the output voltage, so that high-efficiency running can be performed using a small self-excited oscillation converter.

In addition to ECU of the engine generator, the control power supply including the converter of the invention can be applied to various power supply devices such as a choke opening control starter of the engine, an ignition device, battery charging power supply, and an engine starter motor power supply, etc.

What is claimed is:

1. A step-down DC-DC converter comprising:
   switching means which includes at least one MOS transistor connected to a direct-current power supply;
   at least one reactor which is charged by the direct-current power supply during a time interval in which the MOS transistor is turned on;
   an output capacitor connected to the direct-current power supply through the MOS transistor and the reactor, the output capacitor supplying a current to a load; and
   a pulse width modulation circuit inputted a voltage corresponding to an output voltage of the output capacitor and applying a pulse signal of a duty according to the voltage to a gate of the MOS transistor,
   wherein the MOS transistor is an N-channel type,
   the N-channel MOS transistor and the reactor are sequentially connected in series between a negative side of the direct-current power supply and a negative side of the output capacitor, and
   a power supply of the pulse signal applied to the gate of the N-channel MOS transistor is supplied between a positive side and the negative side of the direct-current power supply.

2. A step-down DC-DC converter according to claim 1, wherein the pulse signal of the pulse width modulation circuit is formed by the voltage corresponding to the output voltage of the output capacitor, and
   the pulse signal is inputted to the gate of the N-channel MOS transistor through an isolation circuit.

* * * * *